United States Patent
Shah et al.

(10) Patent No.: US 7,856,829 B2
(45) Date of Patent: Dec. 28, 2010

(54) ELECTRICAL POWER GENERATION METHOD

(75) Inventors: Minish Mahendra Shah, E. Amherst, NY (US); Aqil Jamal, Grand Island, NY (US); Raymond Francis Drnevich, Clarence Center, NY (US); Bart Antonie van Hassel, Getzville, NY (US); Gervase Maxwell Christie, Buffalo, NY (US); Hisashi Kobayashi, Putnam Valley, NY (US); Lawrence E. Bool, III, E. Aurora, NY (US)

(73) Assignee: Praxair Technology, Inc., Danbury, CT (US)

(*) Notice: Subject to any disclaimer, the term of this patent is extended or adjusted under 35 U.S.C. 154(b) by 1034 days.

(21) Appl. No.: 11/639,459

(22) Filed: Dec. 15, 2006

(65) Prior Publication Data
US 2008/0141672 A1 Jun. 19, 2008

(51) Int. Cl.
*F02C 6/18* (2006.01)
(52) U.S. Cl. ..................................................... 60/780
(58) Field of Classification Search .................. 60/780, 60/781, 39.12, 39.182, 39.461, 39.464, 39.465, 60/39.47
See application file for complete search history.

(56) References Cited

U.S. PATENT DOCUMENTS

| | | | | |
|---|---|---|---|---|
| 3,868,817 A * | 3/1975 | Marion et al. | ................. | 60/781 |
| 4,261,167 A * | 4/1981 | Paull et al. | ................. | 60/781 |
| 4,322,389 A * | 3/1982 | Schmid | ................. | 422/187 |
| 5,467,722 A * | 11/1995 | Meratla | ................. | 110/345 |
| 5,570,578 A * | 11/1996 | Saujet et al. | ................. | 60/647 |
| 5,820,654 A | 10/1998 | Gottzman et al. | ................. | 95/54 |
| 5,820,655 A | 10/1998 | Gottzmann et al. | ................. | 95/54 |
| 5,927,103 A | 7/1999 | Howard | ................. | 62/620 |
| 5,964,922 A | 10/1999 | Keskar et al. | | |
| 6,035,662 A | 3/2000 | Howard et al. | ................. | 62/617 |
| 6,070,471 A | 6/2000 | Westphal et al. | ................. | 73/766 |
| 6,139,810 A | 10/2000 | Gottzmann et al. | ................. | 422/197 |
| 6,382,958 B1 | 5/2002 | Bool, III et al. | ................. | 431/2 |
| 6,394,043 B1 | 5/2002 | Bool, III et al. | ................. | 122/488 |
| 6,562,104 B2 | 5/2003 | Bool, III et al. | ................. | 95/54 |
| 6,702,570 B2 | 3/2004 | Shah et al. | ................. | 431/11 |
| 7,008,967 B2 * | 3/2006 | Keyser et al. | ................. | 518/702 |
| 2002/0073938 A1 * | 6/2002 | Bool et al. | ................. | 122/451.1 |

(Continued)

FOREIGN PATENT DOCUMENTS

DE        10330859 A1    2/2004

(Continued)

OTHER PUBLICATIONS

Babcock & Wilcox, Steam 40, "Sulfur Dioxide Control"(1992).

(Continued)

*Primary Examiner*—William H Rodriguez
*Assistant Examiner*—Andrew Nguyen
(74) *Attorney, Agent, or Firm*—David M. Rosenblum (57) ABSTRACT

A method of generating electrical power in which a synthesis gas stream generated in a gasifier is combusted in an oxygen transport membrane system of a boiler. The combustion generates heat to raise steam to in turn generate electricity by a generator coupled to a steam turbine. The resultant flue gas can be purified to produce a carbon dioxide product.

13 Claims, 8 Drawing Sheets

U.S. PATENT DOCUMENTS

2002/0194849 A1* 12/2002 Saviharju et al. .............. 60/670
2006/0112696 A1* 6/2006 Lynghjem et al. ............. 60/772

FOREIGN PATENT DOCUMENTS

| DE | 102004038435 A1 | 2/2006 |
| EP | 1717420 A1 | 11/2006 |
| GB | 713553 | 11/1951 |

OTHER PUBLICATIONS

Okawa et al., Trial Design of a $CO_2$ Recovery Power Plant by Burning Pulverized Coal in $O_2/CO_2$, Energy Convers. Mgmt., vol. 38, supplemental (1997) pp. S123-S127.

U.S. Department of Energy—Office of Fossil Energy and U.S. Department of Energy/NETL, "Evaluation of Innovative Fossil Fuel Power Plants with $CO_2$ Removal", Interim Report (2000).

U.S. Department of Energy, "Evaluation of Fossil Fuel Power Plants with $CO_2$ Recovery", Final Report (2002).

Holt, "Gasification Process Selection—Trade-offs and Ironies", Presented at the Gasification Technologies Conference (2004).

Switzer et al., "Cost and Feasibility Study on the Praxair Advanced Boiler for the $CO_2$ Capture Project's Refinery Scenario", Carbon Dioxide Capture for Deep Geologic Formations—Results from the $CO_2$ Capture Project, vol. 2, Elsevier Science Publishing Company (2005) pp. 1-26.

Dyer et al., "Ion Transport Membrane Technology for Oxygen Separation and Syngas Production", Solid State Ionics 134 (2000) p. 21-33.

Radtke et al., "Renaissance of Gasification based on Cutting Edge Technologies", VGB PowerTech (2005).

* cited by examiner

ELECTRICAL POWER GENERATION METHOD

FIELD OF THE INVENTION

The present invention relates to a method of generating electrical power in which a synthesis gas stream, produced in a gasifier, is combusted to generate heat that is used to raise steam and that is in turn used in a steam turbine to generate electrical power. More particularly, the present invention relates to such a method in which the synthesis gas stream is combusted in a boiler that employs an oxygen transport membrane to supply oxygen to support the combustion and that has provision for the purification of the resultant flue gases to produce a carbon dioxide-rich stream for further utilization or sequestration.

BACKGROUND OF THE INVENTION

Coal-fired power plants are utilized throughout the world to generate electricity. Typically, the coal is either in a pulverized form or within a slurry is combusted to generate heat within a boiler to raise steam. The steam is passed into a steam turbine to generate electrical power.

There has been recent interest in capturing carbon dioxide from power plants that use coal and other carbonaceous feed stock such as asphalt, heavy oil, petroleum coke, biomass or natural gas. An integrated gasification and combined cycle (IGCC) is proposed as a preferred method of power generation when carbon dioxide capture is required. In IGCC, gasification of fuel produces a synthesis gas containing mainly hydrogen, carbon monoxide and carbon dioxide with some amount of methane and sulfur and chloride containing impurities. In a typical gasifier the carbonaceous feed is reacted with steam and oxygen to produce the synthesis gas. Typically, the oxygen is provided to the gasifier by a cryogenic rectification plant in which air is rectified within distillation columns at low temperatures to produce the oxygen.

In an integrated gasification combined cycle, the synthesis gas produced as a result of the gasification is cooled to a temperature suitable for its further processing in a water-gas shift reactor to increase the hydrogen and carbon dioxide content of the synthesis gas. The water-gas shift reactor also hydrolyzes most of the carbonyl sulfide into hydrogen sulfide. The synthesis gas is then further cooled for carbon dioxide and hydrogen sulfide separation within a solvent scrubbing plant employing physical or chemical absorption for separation of the carbon dioxide and hydrogen sulfides and carbonyl sulfide from the synthesis gas. This allows for the capture and sequestration of the carbon dioxide which is present within the synthesis gas. The resulting hydrogen-rich gas is then fed to a gas turbine that is coupled to an electrical generator to generate electricity. Heat is recovered from the cooling of the raw synthesis gas stream, from cooling the heated discharge from the water-gas shift reactor, and cooling the exhaust from the gas turbine to raise steam and to generate additional electrical power from a steam turbine.

As can be appreciated, the integrated gasification combined cycle is environmentally very advantageous in that a clean burning synthesis gas stream is used to power the gas turbine while at the same time, the carbon dioxide produced by the gasification can be captured for use in other industrial processes, for enhanced oil recovery or for sequestration. The disadvantage of such a cycle is the high energy penalty associated with the air separation and solvent scrubbing plants. Additionally, the recovery of heat energy in several stages is inherently inefficient in that such heat recovery always involves loss and in any case, the heat is recovered at a low temperature. Lastly, the use of solvent scrubbing plants, water-gas shift reactors and gas turbines is an expensive proposition given their acquisition costs.

It has been suggested to supply the oxygen to the gasification process in lieu of a cryogenic air separation plant with the use of oxygen transport membranes. In such membranes, oxygen is separated from the air with the use of a gas tight membrane formed of the ceramic material that is capable of oxygen ion transport at elevated temperatures. The oxygen ionizes on one surface of the membrane by gaining electrons to form the oxygen ions. Under a driving force of a partial pressure differential, the oxygen ions pass through the membrane and either react with a fuel or recombine to elemental oxygen liberating the electrons used in the ionization of the oxygen.

Where the membrane material is a mixed conductor, the electrons are transported through the membrane. In a membrane that uses an ionic conductor, that is, capable only of conducting oxygen ions, the electrons are transported with the use of an external electric circuit.

The use of ceramic membrane systems have also been contemplated in connection with boilers to generate product steam that has value as a feed to a refinery or to a steam methane reformer as opposed to a combined cycle incorporating a steam turbine. In such boilers, the combustion of a fuel such as natural gas is supported by oxygen separated within the membrane system. Since such combustion will produce a flue gas rich in carbon dioxide and water, the production of a carbon dioxide-rich stream can be accomplished by condensing the water out of the flue gas and then compressing the stream.

An example of a study of such a boiler with carbon dioxide capture appears in a paper entitled, "Cost and Feasibility Study on the Praxair Advanced Boiler for $CO_2$ Capture Project's Refinery Scenario", Switzer et al. (2005) published by Elsevier. In this paper, a boiler is disclosed in which fuel and recirculated flue gas is passed through a housing having a heat recovery steam generator to exchange heat from a retentate produced by the membrane system with boiler feed water to raise saturated steam. The fuel and flue gas mixture then passes to the membrane system for combustion and generation of the flue gas. Intermingled with the membrane system is another heat recovery steam generator to superheat the saturated steam and thereby to produce the product steam. Heat is recovered from the flue gas to preheat the air and the boiler feed water. Other boiler designs that incorporate oxygen transport membranes and that are capable of producing product steam are disclosed in U.S. Pat. Nos. 6,394,043; 6,382,958 and 6,562,104.

As will be discussed, the present invention provides a method of generating electrical power in which a synthesis gas stream is produced by gasification is then combusted in an oxygen transport membrane to generate heat and in turn raise steam for a steam turbine. As will become apparent, a method of the present invention generates the power in a more thermally efficient manner than an integrated gasification combined cycle with carbon dioxide capture and does not require the use of expensive gas turbines, water-gas shift reactors and solvent recovery units for carbon dioxide capture.

SUMMARY OF THE INVENTION

The present invention provides a method of generating electrical power in which a synthesis gas stream is generated in a gasifier. The synthesis gas stream is combusted to generate heat and a flue gas. The synthesis gas stream is combusted while at an elevated temperature and the flue gas contains carbon dioxide. As used herein and in the claims, the term "elevated temperature" means a temperature that is at least about 50° F. above the dew point of the synthesis gas stream. In this regard, at lower temperatures, excess fuel would be required for its combustion and in any event, water condensation is to be avoided because of potential mechanical and corrosion issues that could be appreciated by those well skilled in the art. The combustion of the synthesis gas stream is supported by separating oxygen from an oxygen containing stream within an oxygen transport membrane system that is operatively associated with a boiler. Steam is produced within the boiler by indirectly transferring the heat to the boiler feed water. Energy is extracted from the steam by a steam turbine system of a steam cycle operatively associated with the oxygen transport membrane boiler. The energy is converted to electrical power by an electrical generator coupled to the steam turbine system. The flue gas stream can then be purified to produce a carbon dioxide-rich stream.

As is apparent from the above description of the invention, since the synthesis gas stream is combusted while at an elevated temperature, the method of the present invention does not have the built-in thermal inefficiency that can be found in prior art integrated gasification combined cycles with carbon dioxide capture. This thermal inefficiency is due to the fact that the carbon dioxide is removed from the synthesis gas in a solvent system that requires the synthesis gas to be cooled to near ambient temperatures and the energy input that is required to operate the solvent system. As will also be discussed, the flue gas stream can be directly purified in a manner that will be discussed in more detail below that does not involve the use of solvent scrubbing units.

Advantageously, in a particularly preferred embodiment, the synthesis gas stream can be expanded within an expander having at least one expansion stage prior to the combusting of the synthesis gas stream and the synthesis gas stream can be partially oxidized prior to expanding the synthesis gas stream in at least one partial oxidation stage. The partial oxidation will act to oxidize a volatile content of the synthesis gas stream and will further heat the synthesis gas stream. The expander can be coupled to another electrical generator to generate the additional electrical power.

Preferably, the partial oxidation stage is formed by an oxygen transport membrane rector generating oxygen to support the oxidation of the synthesis gas stream. In an alternative embodiment of the present invention, the at least one expansion stage and the at least one partial oxidation stage can be a first partial oxidation stage followed by a first expansion stage, a second partial oxidation stage following the first expansion stage and then a second expansion stage following the second partial oxidation stage.

Combustion of the synthesis gas stream in the oxygen transport membrane boiler can be incomplete resulting in fuel species being present within the flue gas stream. In such case, the fuel species can be separated from the flue gas stream and recycled to the at least one partial oxidation stage. Another variation is to conduct the process such that the combustion of the synthesis gas stream supported by separating oxygen from an oxygen containing stream within an oxygen transport membrane system is not complete. In such case, the combustion of the synthesis gas stream can be completed by addition of an oxygen containing stream. The advantage of such embodiments is to conserve the amount of material used from the oxygen transport membranes within the oxygen transport membrane system.

Advantageously, the carbon dioxide can be purified by cooling the flue gas stream to produce a cooled flue gas stream. After removing sulfur dioxide, the flue gas stream can be compressed and then dried within a dryer to produce a carbon dioxide containing stream having a purity of no less than about 90% by volume. The carbon dioxide containing stream can be further compressed to produce a carbon dioxide product stream. The carbon dioxide product stream has further known industrial uses such as enhanced oil recovery. In any case, the carbon dioxide product stream can be further distributed by a pipeline.

Where the combustion of the synthesis gas stream results in fuel species being present within the flue gas stream, the fuel species can be separated from the flue gas stream after having been dried and prior to being further compressed.

Although there are a variety of different gasifiers and different feed stocks that are possible, the gasifier can generate the synthesis gas stream through the gasification of coal. In this regard, the gasification of the coal can be conducted in a moving bed gasifier utilizing steam generated by the steam cycle. In any embodiment of the present invention, the steam cycle can be an ultra-supercritical steam cycle.

The gasifier can be an entrained flow gasifier. In such case, the synthesis gas stream is cooled by indirect heat exchange with a heated boiler feed water stream to produce a steam stream. The steam stream can then be combined with steam produced within the boiler.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
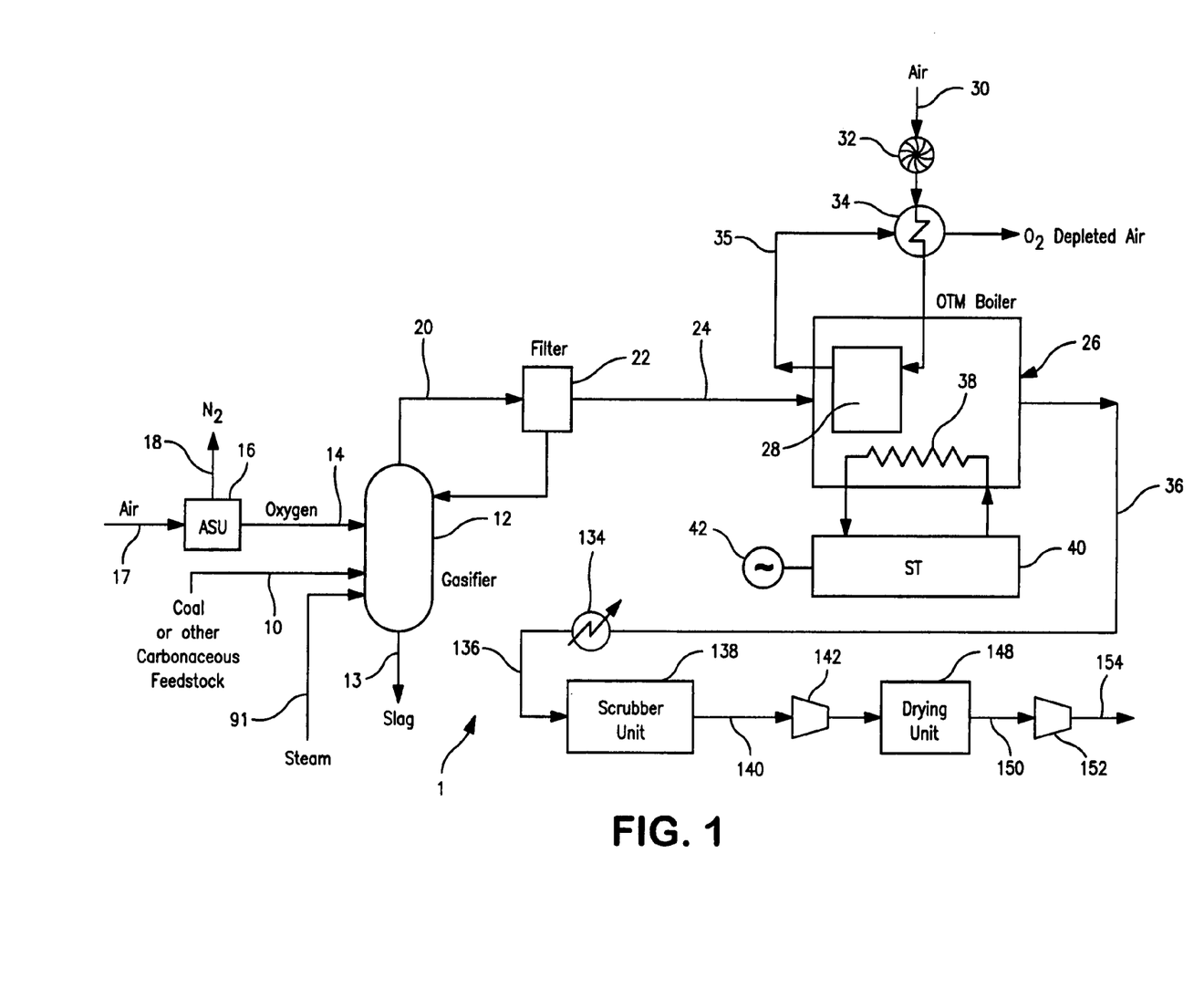
FIG. 1 is a process flow diagram of a method for generating electrical power in accordance with the present invention.

With reference to FIG. 1, the present invention illustrates an apparatus 1 for carrying out a method in accordance with the present invention in which coal is gasified. This is for exemplary purposes because as indicated above, feed stock to be gasified could be other substances such as coal, asphalt, heavy oil, petroleum coke, biomass or natural gas.

In accordance with FIG. 1, a prepared coal feed stream 10 is gasified within a gasifier 12 with the addition of a gasifying agent such as an oxygen stream 14. Oxygen stream 14 is created by the cryogenic rectification of air within a cryogenic rectification unit 16. In some gasifiers such as moving bed gasifiers high pressure steam as a steam stream 91, to be discussed, is also injected into the gasifier.

Cryogenic rectification unit 16 ("ASU") consists of a compressor to compress an air stream 17 and a purifier to remove the higher boiling contaminants such as carbon dioxide, water and hydrocarbons. The resultant purified and compressed stream is then cooled within a main heat exchanger against return streams consisting of the fractionated components of the air, namely, nitrogen and oxygen. The oxygen is discharged as oxygen stream 14 and the nitrogen is discharged as a nitrogen stream 18. If necessary, the oxygen stream 14 can be compressed to suitable pressure for injection into gasifier 12.

In a typical cryogenic rectification unit 16, the air is cooled within the main heat exchanger to a temperature suitable for its rectification, generally in a double distillation column having a high pressure column that is operatively associated with the low pressure column by a condenser-reboiler. The high pressure column will typically operate at a pressure of about 5 bar absolute to produce a nitrogen-rich overhead and an oxygen-rich, column bottoms. An oxygen-rich column bottoms is further refined within the low pressure column that generally operates at a pressure of about 1.2 bar absolute. The column bottoms of the lower pressure column is enriched in the oxygen. The oxygen is vaporized against condensing a nitrogen-rich tower overhead produced in the higher pressure column. The resulting condensate of the higher pressure column is valve expanded and used to reflux the lower pressure column.

Other alternatives for generation of the oxygen stream 14 are possible. For example, an oxygen transport membrane reactor in which the compressed air can be partially combusted within a combustor and introduced into the oxygen transport membrane reactor for separation of oxygen in a manner known in the art.

Gasifier 12 incorporates any of the numerous commercially available gasification technologies. For example, in the counter-current "fixed" (or moving) bed type of gasifier, a downward flowing bed of carbonaceous fuel is contacted with gasification products generated by steam and oxygen that enter at the bottom of the moving bed. The gasification products flow in a counter-current configuration relative to the carbonaceous bed. The slag or ash 13 will be removed in all gasifiers. For example, in a counter-current fixed bed gasifier the reference number 13 would designate a slag for removal. In a fluid bed gasifier the fuel particles are fluidized as a result of injection of oxygen and steam at or near the bottom of the bed. In the entrained flow gasifier dry pulverized solids such as pulverized coal or a fuel slurry is gasified with oxygen in a co-current flow.

Within gasifier 12, known reactions involving the coal and the oxygen produces a synthesis gas stream 20 which contains hydrogen, carbon monoxide, methane, carbon dioxide, steam, sulphur compounds and small quantities of higher hydrocarbons. The temperature of synthesis gas stream 20 will depend on the type of gasifier used. In the entrained flow gasifier of gasifier 12, the synthesis gas exits the gasification section of the process at a temperature of between about 1600° F. and about 3500° F. It is to be noted, however, that other types of gasifiers could be used in an integration in accordance with the present invention and as such, it is worth mentioning that in other types of the gasifiers, the synthesis gas stream will be produced at other temperature ranges. For example, in fixed bed gasifiers, the synthesis gas will be produced at temperatures of between about 900° F. and about 1000° F.

Particulate removal from the synthesis gas stream 20 can be carried over by known techniques that include a cyclone or a candle filter 22. Candle filter 22 can be ceramic or metallic candle filters which are used for removing such particulate matter from a synthesis gas stream 20. Candle filter 22 should in any case preferably operate about 700° F. and more preferably above 1000° F. It is to be noted that filtering is optional in that it is generally present to protect an expander from erosion. In some gasifiers, the stream is recycled to the front end thereof to improve carbon conversion.

The resultant filtered syngas stream 24 contains a synthesis gas that is then sent to an oxygen transport membrane boiler 26. Although there is no particular oxygen transport membrane boiler that is preferred, in any such device the filtered synthesis gas stream 24 is introduced into an oxygen transport membrane system 28 that can comprise a plurality of tubes made of a ceramic material that can be a mixed conductor or a dual-phase conductor, such as described above. It is understood that oxygen transport membrane system 28 could employ oxygen transport membrane elements in forms other than tubes, for instance, planar elements also known in the art. An oxygen containing gas, for example air is introduced into the tubes as an air stream 30 with the use of a blower 32. Air stream 30 is preheated by means of a waste heat recovery heat exchanger 34 prior to being introduced into the oxygen transport membrane tubes. The oxygen ions permeate through the membrane and immediately combine with the filtered synthesis gas stream 24 to support combustion of the filtered synthesis gas stream 24. The oxygen depleted retentate, as a retentate stream 35, is passed through the waste heat recovery heat exchanger 34 for recovery of heat and discharge.

In the illustrated oxygen transport membrane boiler 26, combustion of the filtered synthesis gas stream 24 provides the driving force for the oxygen separation within the oxygen transport membrane system 28. As such, air stream 30 is not appreciably compressed. However, while it is possible to integrate an oxygen transport membrane boiler that does utilize compression for the oxygen containing gas in accordance with the present invention, such integration is not preferred due to the power penalty involved in such compression.

Preferably, the surface temperature of the OTM tubes is maintained at between about 1600° F. and about 2000° F. throughout the oxygen transport membrane boiler 26. A flue gas stream 36 is discharged from the oxygen transport membrane boiler 26 in a temperature of preferably between about 1600° F. and about 2000° F. It consists predominately of water and carbon dioxide with small amounts of nitrogen, argon and sulphur dioxide and potentially residual oxygen.

Figure 2:
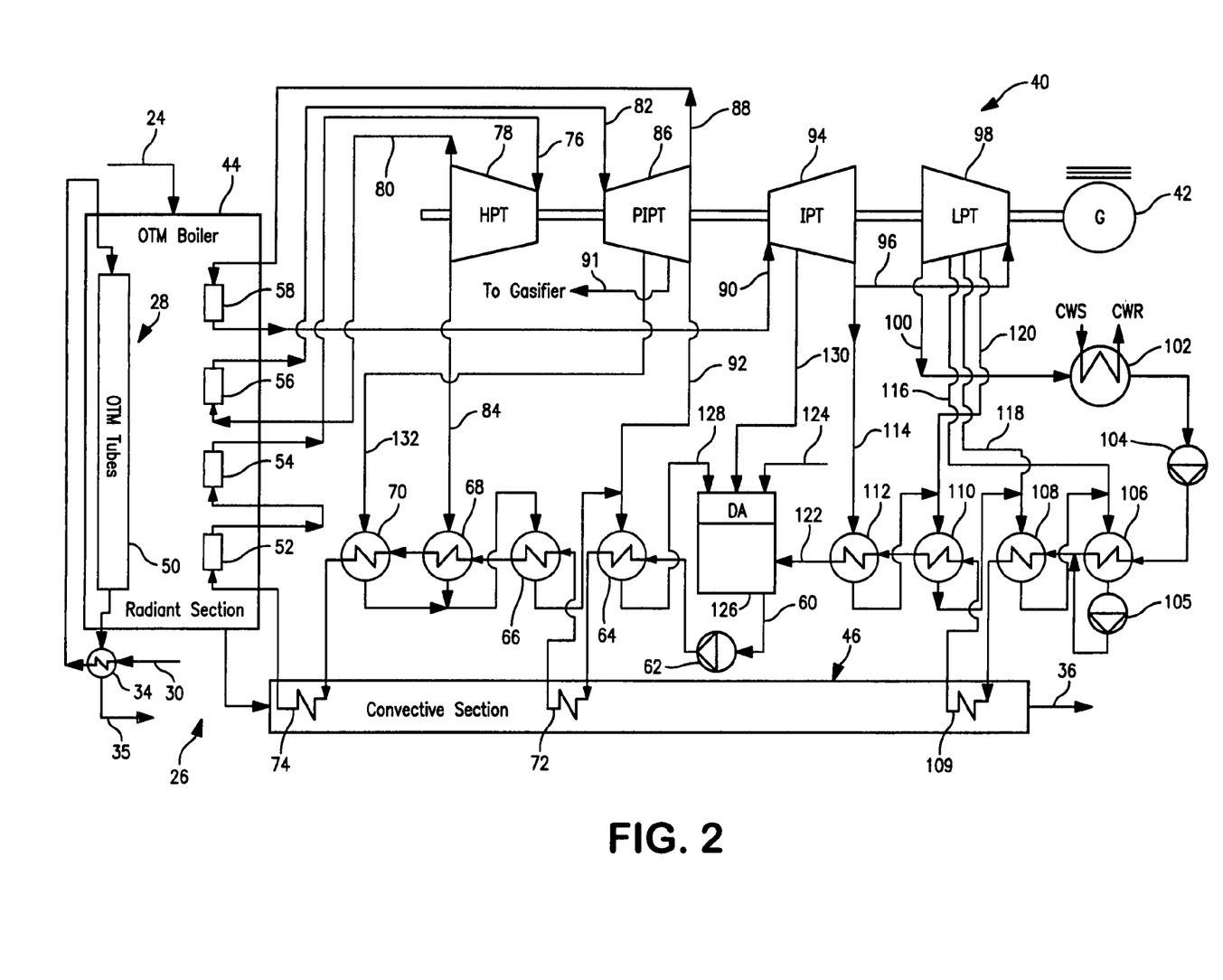
FIG. 2 is a schematic of a boiler incorporating an oxygen transport membrane system integrated with a steam cycle.

The heat generated by the combustion occurring within the oxygen transport membrane boiler 26 is recovered by a heat exchange network, generally indicated by reference numeral 38 in which steam is generated and utilized in a steam cycle ("ST") generally indicated by block 40 that incorporates a steam turbine system to generate power that can be applied to driving an electrical generator 42. There are many steam cycles that are possible for use in connection with the present invention and in fact the design of the steam cycle is a routine matter that is often carried out by computer programs that are specifically capable of generating such designs. As will be discussed, ultra-supercritical steam cycles are preferred. However, sub-critical and supercritical steam cycles are also possible. Moreover, there are many possible designs for oxygen transport membrane boiler 26. Having said this, as an example, a more detailed description of a suitable design that can be used in connection with oxygen transport membrane boiler 26 and the associated steam cycle 40 is illustrated in FIG. 2.

With specific reference now to FIG. 2, oxygen transport membrane boiler 26 is based upon a conventional commercially available unit that has been modified in a manner that will be discussed hereinafter. Oxygen transport membrane boiler 26 generally consists of a radiant section 44 in which radiant heat transfer predominates and a convective section 46 in which heat transfer is accomplished by convective heat transfer. Oxygen transport membrane boiler 26 is integrated with a steam cycle 40.

Radiant section 44 is modified with the provision of oxygen transport membrane tubes 50 that form the oxygen transport membrane system 28 of oxygen transport membrane boiler 26. Oxygen transport membrane tubes 50 are connected in parallel to receive air stream 30 and alternate with a series of steam tubes 52, 54, 56 and 58 forming part of the heat exchange network 38 to raise steam and for the steam cycle 40. In the illustrated embodiment, steam tubes 52, 54, 56 and 58 are in series. However, in practice they could be positioned anywhere in the radiant section 44 in that such section has a uniform temperature. Although not specifically illustrated, each of the steam tubes 52, 54, 56 and 58 would be part of larger alternating arrays in which all steam tubes of an array, for example, steam tubes 52 would be connected in parallel. Furthermore, as also not illustrated, saturated steam produced within steam tubes 52 can be collected in a steam drum prior to introduction into steam tubes 54.

With respect to the steam cycle 40, an ultra-supercritical steam cycle is preferred and as used herein and in the claims means a cycle that employs steam at a temperature of at least about 1000° F. and at a pressure of at least 4000 psia. The following discussion of steam cycle 40 utilizes temperatures and pressures that are applicable to examples 1 and 2 discussed below.

In accordance with steam cycle 40, a boiler feed water stream 60 is pressurized by being pumped by a pump 62 and preheated within preheaters 64, 66, 68 and 70 and heat exchangers 72 and 74 within convective section 46 to a temperature of about 650° F. and a pressure of about 4366 psia that has been imparted through the pressurization less piping losses. It is to be noted, that heat exchangers 72, 74 and 109, to be discussed and the steam tubes 52, 54, 56 and 58 form the heat exchange network 38 of oxygen transport membrane boiler 26.

The boiler feed water stream 60, thereafter, enters steam tubes 52 that act as a steam generator and then to steam tubes 54 to superheat the generated steam to produce a steam stream 76 at a temperature of about 1080° F. and a pressure of about 4050 psia. Steam stream 76 is then introduced into high pressure steam turbine 78 ("HPT") where it is expanded to 1226 psia. About 2725 klb/hr of expanded steam, that constitutes about 90% of stream 76, as a stream 80 is passed through steam tubes 56 that serve as a reheater where stream 80 is reheated to a temperature of about 1111° F. to produce a stream 82 having a pressure of about 1170 psia. The remaining part 84 is introduced into preheater 68.

Reheated stream 82 is then introduced into a primary intermediate pressure turbine 86 ("PIPT") to be expanded to about 505 psia and a temperature of about 822° F. About 2328 klb/hr of this steam as a stream 88, that constitutes about 85% of stream 80, is introduced into steam tubes 58 that serve as a second reheater to produce a reheated stream 90 having a temperature of about 1111° F. The remainder of the expanded steam is introduced as a stream 92 to preheater 64.

Reheated stream 90 is then introduced into intermediate pressure steam turbine 94 ("IPT"). A stream 96 is then expanded in low pressure turbine 98 ("LPT") to a pressure of about 0.75 psia. The resulting stream 100 is then passed into a condenser 102 and then pumped by pump 104 to a series of low pressure boiler-feed water heaters 106, 108, 109, 110 and 112 to be heated to about 210° F. using extracted steam streams 114, 116, 118 and 120 taken from intermediate pressure steam turbine 94 and low pressure turbine 98. All of the extracted streams are combined, pumped to pressure by pump 105 and combined with stream 100. The resultant heated feed water stream 122 is mixed with feed water stream 124 in deairator 126 along with a stream 128 and a stream 130 extracted from intermediate pressure steam turbine 94 and used to strip volatile gases from the water. Stream 128 is made up of stream 92, stream 84 and a stream 132 extracted from primary intermediate pressure steam turbine 86. Stream 60 from deairator 126 is pumped by pump 62 to a pressure of about 4452 psia.

Referring again to FIG. 1, flue gas stream 36 is then purified by first being cooled within a water-cooler 134 to a temperature of between about 160° F. and about 300° F. Cooled stream 136 is then sent to a flue gas desulphurization scrubber unit 138 well known in the art and that is capable of removing more than about 98% by volume of the sulphur dioxide. Flue gas desulphurization scrubber unit 138 is a known system that can be obtained from a variety of manufacturers, for example, Babcock & Wilcox Company, 20 S. Van Buren Avenue Barberton, Ohio, U.S.A 44203-0351. Typically, a flue gas desulphurization scrubber unit 138 will typically comprise three parts, namely, limestone handling and reagent preparation, where limestone is received, stored and grinded in a ball mill to prepare an aqueous slurry. A second part is a scrubber where the limestone slurry is brought into contact with a flue gas which in the illustrated embodiment would be cooled stream 136 in a counter-current mode in a spray-tower column. This is followed by by-product dewatering where the bleed slurry from the flue gas desulphurizor absorber is dewatered and gypsum is separated and stored. The resulting partly purified flue gas stream 140 consists mainly of carbon dioxide and about 10 to 15 mole percent of water with some residual argon and nitrogen, oxygen and trace amounts of sulphur dioxide.

Partly purified flue gas stream 140 is then compressed in a base load compressor 142 to a pressure of between about 300 psia and about 500 psia and then dried within a drying unit 148 to remove moisture. The drying unit is a glycol system that is a known system that is typically used for drying natural gas. Preferably, although not illustrated, partly purified flue gas stream 140 is first cooled to about 110° F. prior to such compression and any condensate removed to conserve on the energy of compression. It is also understood that base load compressor 142 is generally a multistage, inter-cooled compression system with knock-put drums to remove additional water. Glycol systems can be obtained from a variety of sources including NATCO Group Inc. 2950 North Loop West, Suite 750 Houston, Tex. 77092. In a typical glycol system, partly purified flue gas stream 140 after compression is contacted in a counter-current manner within a glycol solution in an absorption column. The dried gas leaves the top of the absorption column. The glycol solution containing absorbed water is sent to a connected distillation column. Heat is supplied to separate the water and the regenerated glycol solution is circulated back to the absorption column using a pump. A heat exchanger is used to exchange heat between the glycol solutions flowing between the two columns. The removal of water prevents the formation of carbonic acid in the carbon dioxide product that could corrode pipelines. Normally, the water level should be reduced below about 600 ppm by volume for this purpose.

Additionally, reducing the water content will prevent freezing when used in downstream processing such as subambient purification processes. Although not illustrated, a dryer for such purpose could be based on adsorption using molecular sieves. In such case, the dryer can comprise a multi-bed molecular sieve dryer system in which half of the beds process the feed to be dried and the other half undergo regeneration. A product portion of the product gas is used as a regenerating gas which is heated to about 450° F. with a heater to remove moisture from the beds. After the beds are free to moisture the regeneration gas at near-ambient temperature is passed through the beds to cool them down. The regeneration gas can then be recycled to a base load carbon dioxide compressor 142 at an appropriate point upstream of the last stage that is utilized for such purpose.

The dried stream 150 from drying unit 148 is then passed to a booster compressor 152 to produce a product stream 154 that can be passed to a pipeline or for enhanced oil recovery or sequestration purposes. Booster compressor 152 is a multi-stage, inter-cooled machine. The product stream 154 preferably has a carbon dioxide content of at least about 90% by volume and as indicated in the examples, the carbon dioxide content can be about 92% or about 95% by volume.

Figure 3:
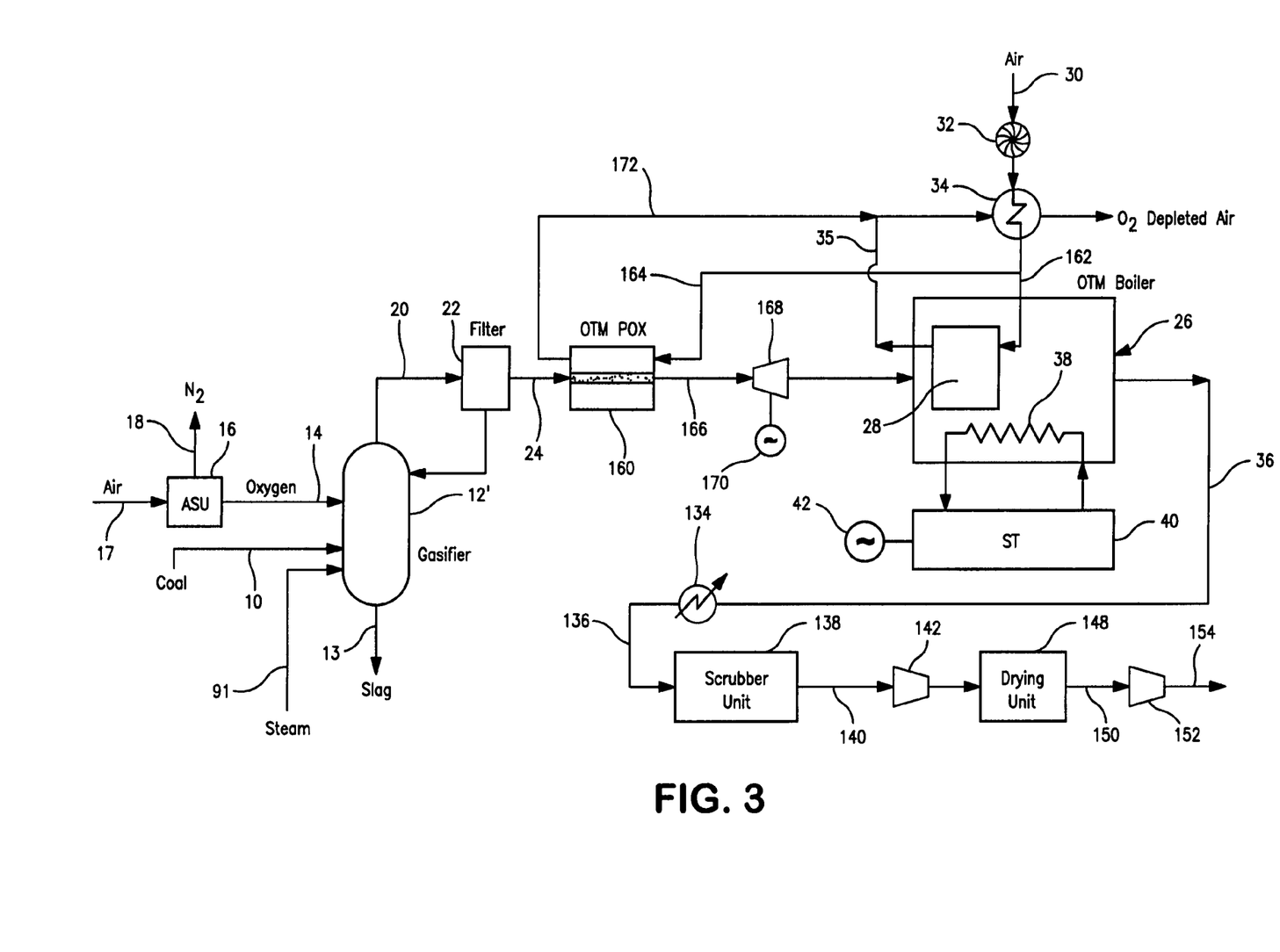
FIG. 3 is an alternative embodiment of FIG. 1.

With reference to FIG. 3, another embodiment is illustrated that utilizes an oxygen transport membrane partial oxidation reactor 160. This feature has particular applicability to where the coal is gasified in a moving bed gasifier that utilizes less oxygen than other types of gasifiers. In such embodiment, synthesis gas stream 20 produced by a moving bed gasifier 12' at a temperature of between 900° F. and about 1000° F. and contains volatile substances such as tars and oils. Steam is also utilized in such gasifier and is obtained, as indicated in FIG. 2, by way of stream 91 extracted from an intermediate stage of intermediate pressure steam turbine 94 or possibly other sources not shown. Partial oxidation reactor 160 partially oxidizes the syngas to raise its temperature from between about 1600° F. and about 1800° F. to remove such volatile substances such as tars, oils and phenols that are oxidized to hydrogen, carbon monoxide, methane and carbon dioxide. Partial oxidation reactor 160 employs one or more oxygen transport membrane elements that are typically mixed conductors in tubular form. At about 1800° F., partial oxidation reactions will proceed in the absence of a catalyst. In this regard, the synthesis gas stream 20 will often contain sulfur that is a known catalyst poison and if a catalytic reactor were used, upstream treatment or a sulfur tolerant catalyst would be required. Typical examples of partial oxidation reactors are well known and are illustrated in U.S. Pat. Nos. 5,820,654; 5,820,655 and 6,139,810.

In such embodiment as illustrated in FIG. 3, the air stream 30 is divided into first and second subsidiary oxygen containing streams 162 and 164. First subsidiary oxygen containing stream 162 is fed to oxygen transport membrane boiler 26. Second subsidiary oxygen containing stream 164 is supplied to the inside of the oxygen transport membrane elements of partial oxidation reactor 160. The filtered synthesis gas stream 24 is supplied to the exterior to the shell of such reactor and the oxygen ions react with the volatiles to produce the reaction products mentioned above. Alternatively, separate air supplies along with blowers and heat exchangers analogous to units 32 and 34 can be used to supply the oxidant to units 26 and 160.

The resultant synthesis gas stream 166, after having the volatiles reacted in the oxygen transport membrane partial oxidation reactor 160, has a pressure of between about 300 and about 1200 psia. Synthesis gas stream is then expanded within an expander 168 coupled to an electrical generator 170 to generate additional electrical power. Between about 60% and about 80% of the total oxygen requirement for apparatus 1 will typically be supplied by the oxygen transport membranes contained within oxygen transport membrane partial oxidation reactor 160 and the oxygen transport membrane boiler 26. The remainder is supplied by cryogenic air separation unit 16 and to the gasifier 12'. A retentate stream 172 joins retentate stream 35 and the combined stream is fed to heat recovery heat exchanger 34.

Figure 4:
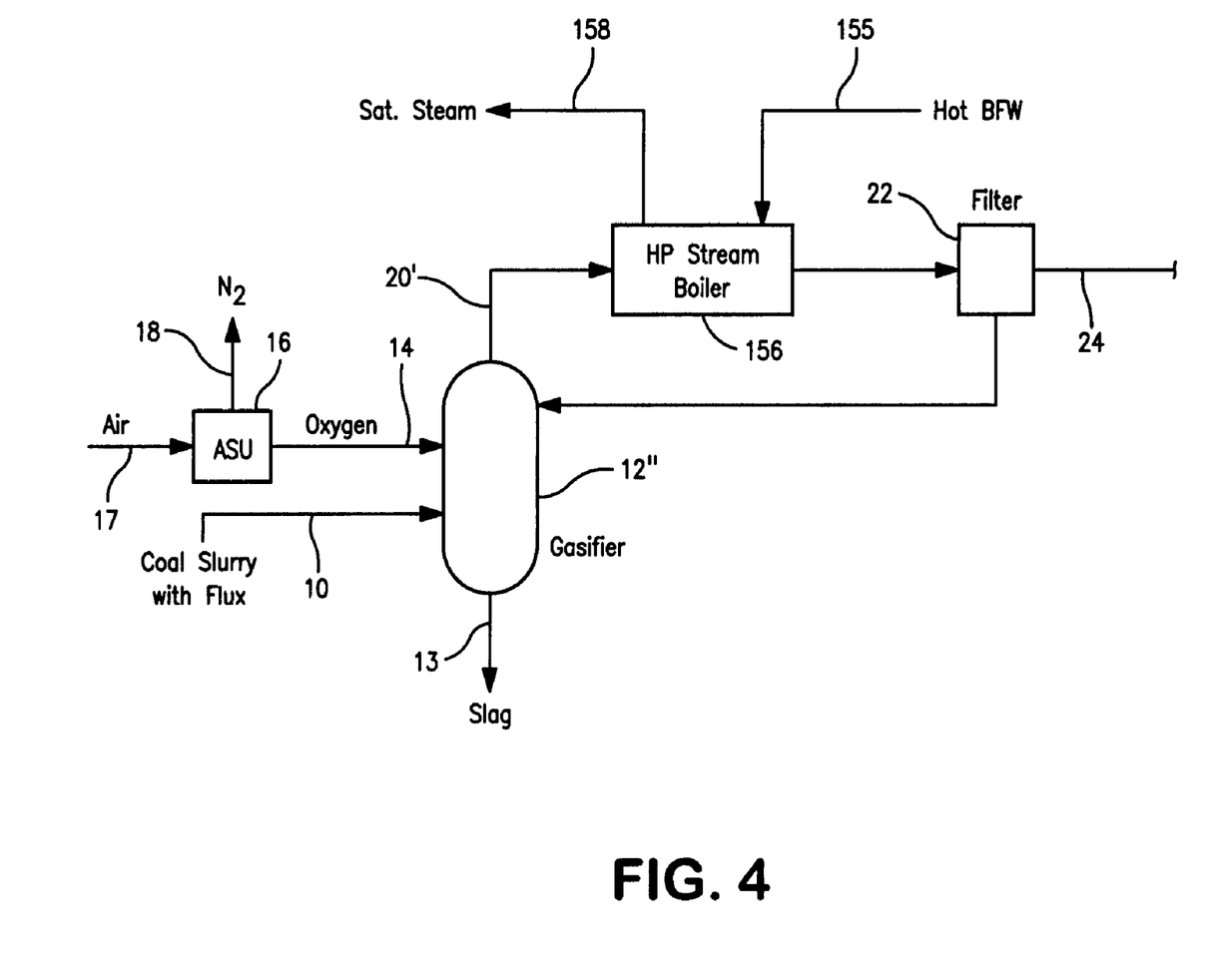
FIG. 4 is a fragmentary view of an alternative embodiment of FIG. 3.

With brief reference to FIG. 4, an alternative embodiment of FIG. 3 is illustrated that utilizes an entrained flow or fluid bed type of gasifier 12". Since the temperature of synthesis gas stream 20' produced by such a gasifier is about 1800° F., a high pressure steam boiler 156 is provided to produce a steam stream 158 from hot boiling feed water stream 155. Steam stream 158 can be combined with the steam entering steam tube 54 located within oxygen transport membrane boiler 26 and shown in more detail in FIG. 2. The boiler 156 decreases the temperature of stream 20' to facilitate the use of high temperature filters which are currently limited to operating temperatures below about 1000° F. These filters are used to minimize erosion in hot gas expanders as has been mentioned above.

Figure 5:
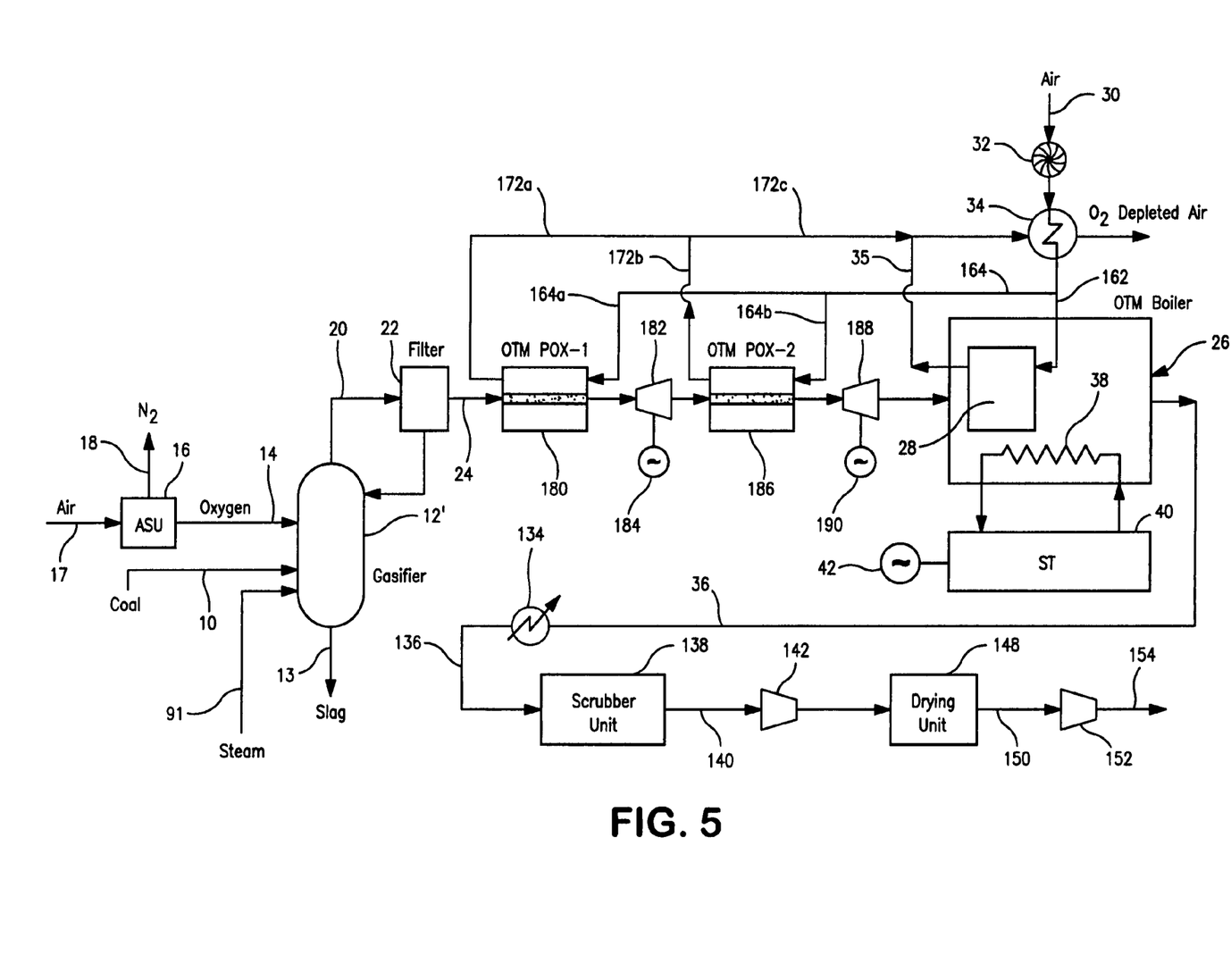
FIG. 5 is an alternative embodiment of FIG. 3.

With reference to FIG. 5, stages of partial oxidation and expansion are illustrated in which the filtered synthesis gas stream 24 is introduced into a first partial oxidation stage produced by a first partial oxidation reactor 180 followed by expansion within expansion stage provided by an expander 182 coupled to an electrical generator 184 to generate additional electricity. Thereafter, the treated filtered synthesis gas stream 24 after expander 182 is then introduced into a second partial oxidation stage provided by a second partial oxidation reactor 186 followed by a second expansion stage provided by a second expander 188 coupled to an additional electrical generator 190 for generating yet additional electrical power. In such embodiment, second subsidiary oxygen containing stream 164 is divided into portions 164a and 164b that are fed into the first partial oxidation reactor 180 and the second partial oxidation reactor 186. The resultant oxygen depleted retentate streams 172a and 172b are combined to produce a combined stream 172c that is further combined with retentate stream 35 and passed through heat recovery heat exchanger 34. Again, independent air supply systems are also possible as have been discussed above.

Figure 6:
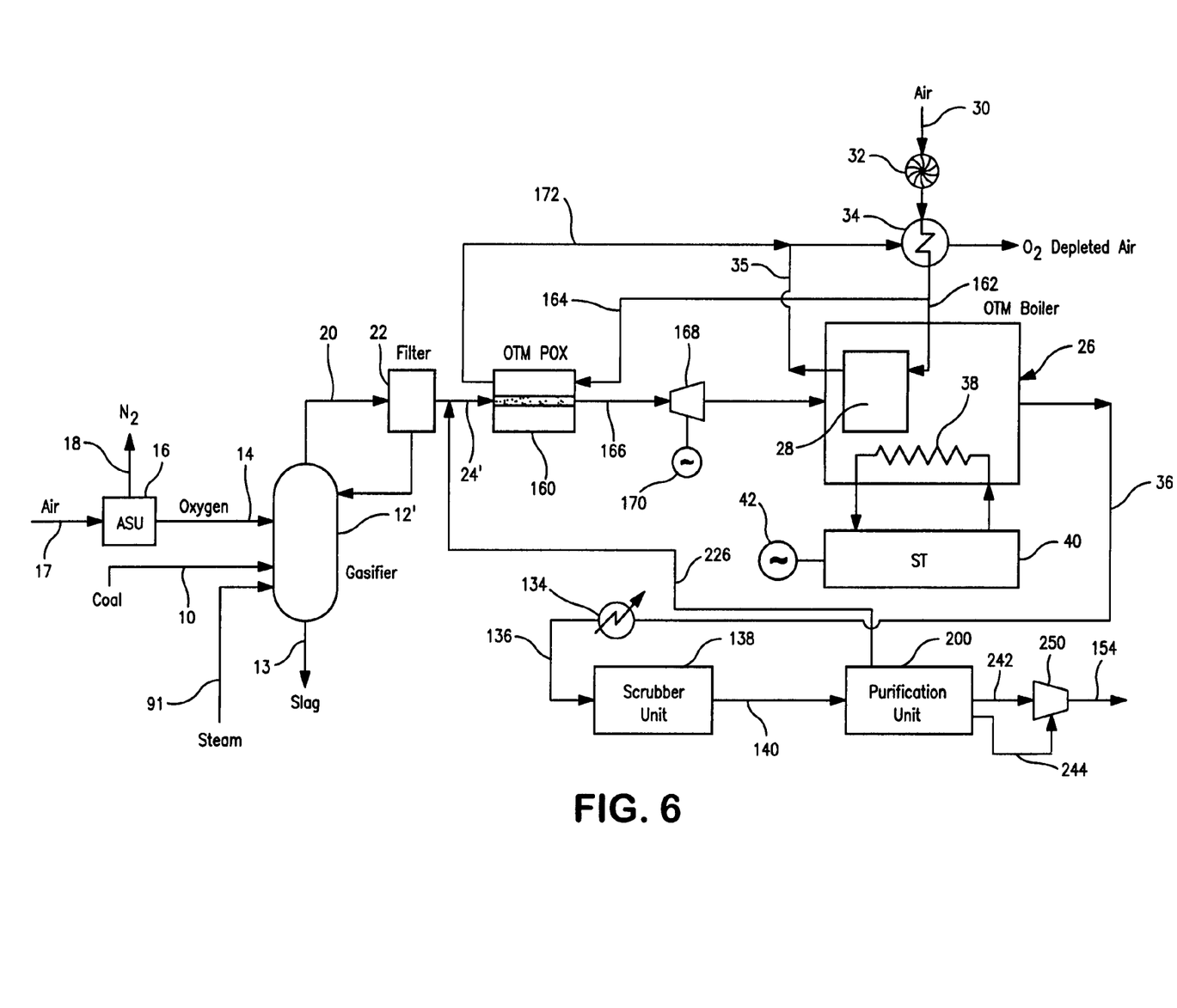
FIG. 6 is an alternative embodiment of FIG. 3.

With reference to FIG. 6, an embodiment is illustrated in which combustion is not completed within oxygen transport membrane system 28 of boiler 26. Typically, the area required for oxygen transport that would be necessary for complete combustion would be quite high. In order to avoid excessive costs, combustion may be completed only to the extent of between about 80% and about 90% of the fuel species contained within synthesis gas stream 20. In such a situation, flue gas stream 36 will contain small amounts of fuel species such as hydrogen and carbon monoxide. Carbon dioxide stream could then be further purified within a purification unit 200 that incorporates cryogenic distillation. Alternative methods of purification including distillation processes with external refrigeration can be used to form purification unit 200. Well known purification processes are illustrated in U.S. Pat. Nos. 5,927,103; 6,035,662 and 6,070,471.

Figure 7:
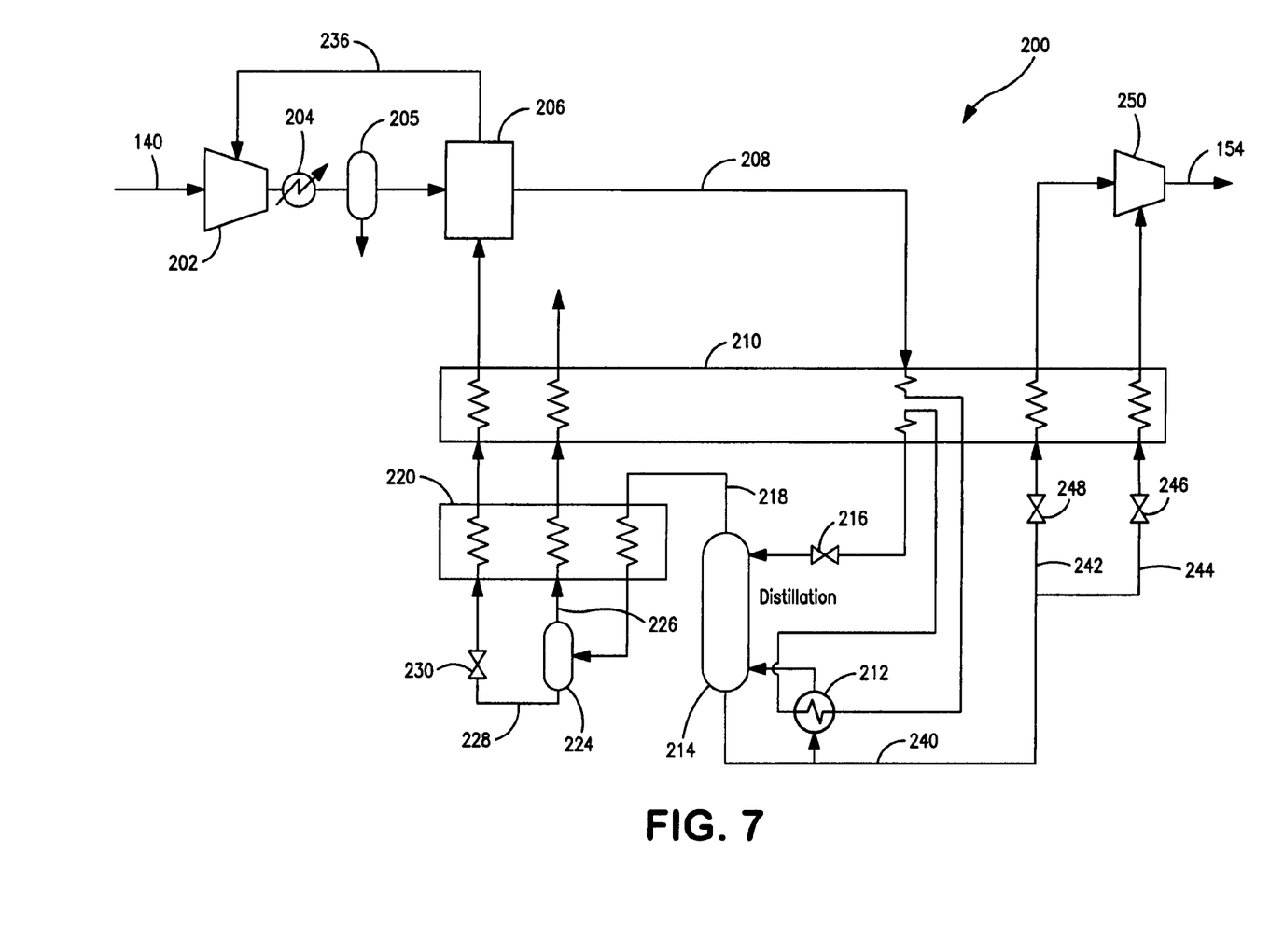
FIG. 7 is an embodiment of the purification unit used in FIG. 6.

With reference to FIG. 7, a specific embodiment of purification unit 200 is illustrated that purifies partly purified flue gas stream 140. Partly purified flue gas stream 140 is compressed in a compressor 202 to a pressure of between about 150 psia and about 1000 psia. The amount of carbon dioxide that can be recovered is a function of the feed pressure supplied to the cold box. As can be appreciated, carbon dioxide recovery can be increased by increasing this pressure. However, such increase in pressure will result in greater production costs. After having been cooled within water cooled chiller 204, partly purified flue gas stream 140 is then introduced into a phase separator 205 to disengage water that has been condensed within partly purified flue gas stream 140 by virtue of its having been cooled in water cooled chiller 204.

The partly purified flue gas stream 140 is then introduced into a dryer 206. Dryer 206 is preferably an adsorption system that can contain beds of molecular sieve adsorbent operating out a phase to adsorb moisture and other impurities such as heavy hydrocarbons that will boil at a higher temperature than the partly purified flue gas stream 140. The beds of molecular sieve adsorbent operate out a phase so that as one bed is adsorbing such higher boiling impurities the other bed is being regenerated. Even number of beds numbering greater than two can also be used for large flows with half of beds performing adsorption while the other half of beds undergoing regeneration. A bed is regenerated by lowering its pressure and/or by increasing its temperature to desorb the adsorbed component and then purging the bed with a stream that is lean in the adsorbed component. In a system that employs temperature swing, the bed is regenerated by heating a stream lean in the adsorbed component and then introducing it into the bed to be regenerated to cause desorption and to carry away desorbed components. These systems vary but there are many examples of the same known that are well known in the art. In this regard, non-adsorbent based systems are possible such as by the use of reversing heat exchangers that are well known in the art of distillation.

The resultant dried feed stream 208, that consists of partly purified flue gas stream 140 after having been compressed by compressor 202 and dried, is then introduced into a main heat exchanger 210 in which it is partly cooled and then introduced into a reboiler 212 that serves to produce boil up or initiate an ascending vapor phase within a stripping column 214. Dried feed stream 208 is then again introduced into main heat exchanger 210 in which it is fully cooled to at least partially liquefy the dried feed stream 208. The dried feed stream 208 is then introduced into an expansion valve 216 into stripping column 214 to initiate a descending liquid phase within such column.

As well known in the art, stripping column 214 preferably has structured packing to contact the ascending vapor phase flowing up through the packing with a descending liquid film of the liquid phase. Other vapor-liquid contacting elements known in the art could be used such as sieve trays. As a result of the contact, the descending liquid phase becomes evermore rich in carbon dioxide, the less volatile component and the ascending vapor phase becomes evermore rich in impurities that have a higher volatility than the carbon dioxide. Within stripping column 214, the remaining uncombusted constituents of the filtered synthesis gas stream 24, namely, hydrogen, carbon monoxide and methane, and any inert constituents that may arise from air ingress into combustion zone, namely, nitrogen and argon, all being more volatile than the carbon dioxide, will be stripped from the descending liquid to produce a carbon dioxide-lean column overhead and a carbon dioxide-rich, liquid column bottoms.

A column overhead stream 218 can be extracted from stripping column 214 that is composed of the carbon dioxide-lean column overhead and then introduced into an auxiliary heat exchanger 220 so that the carbon dioxide overhead stream 218 is at least partially liquefied. The carbon dioxide overhead stream 218 is then introduced into a phase separator 224 to produce a carbon dioxide-depleted vapor stream 226 and a carbon dioxide-rich liquid stream 228. Carbon dioxide-rich liquid stream 228 is expanded within an expansion valve 230 and then passed together with the carbon dioxide-depleted vapor stream 226 into auxiliary heat exchanger 220. Expansion valve 230 provides refrigeration for the partial liquefaction of carbon dioxide overhead stream 218.

Carbon dioxide-depleted vapor stream 226 can be passed into main heat exchange 210 and then recycled and combined with filtered synthesis gas stream 24 to provide a synthesis gas feed stream 24' to oxygen transport membrane partial oxidation reactor 160. As would be understood by those skilled in the art, if the gasifier used operates at a higher pressure than carbon dioxide-depleted vapor stream 226, a recycle compressor would have to be provided to accomplish the recycle. A small amount of stream 226 can be purged from the process as a fuel stream to avoid the build up of inerts such as nitrogen and argon in the loop. The purge gas may require incineration or catalytic oxidation or other treatment to manage carbon monoxide, methane, or other emissions.

Carbon dioxide-rich liquid stream 228 after having passed through main heat exchanger 210 will be vaporized and as such can be used to regenerate dryer 206, for example, such stream can be heated and then introduced into an adsorption bed for regeneration purposes and thereafter, be reintroduced as a recycle stream 236 into an appropriate stage of compressor 202 to enhance carbon dioxide recovery.

A carbon dioxide product stream 240 as a liquid can be extracted from stripping column 214 that is composed of carbon dioxide-rich liquid column bottoms. The carbon dioxide product stream can then be expanded in an expansion valve to generate refrigeration for the process. Advantageously, carbon dioxide product stream 240 is split into subsidiary streams 242 and 244 and at least the subsidiary stream 244 is expanded to lower pressure by the use of expansion valve 246, optionally both streams 242 and 244 are simultaneously expanded to lower and the higher pressures by the use of expansion valves 246 and 248, respectively. Both subsidiary streams 242 and 244 are then vaporized in main heat exchanger 210. The resultant lower pressure subsidiary stream 242 is introduced into the inlet of product compressor 250. The lower pressure subsidiary stream 244 is introduced into an intermediate stage of product compressor 250. The product compressor 250 could be a multi-stage compressor with interstage cooling. It is to be noted, that, although not illustrated, some of the carbon dioxide product could be taken as a liquid from carbon dioxide product stream.

Figure 8:
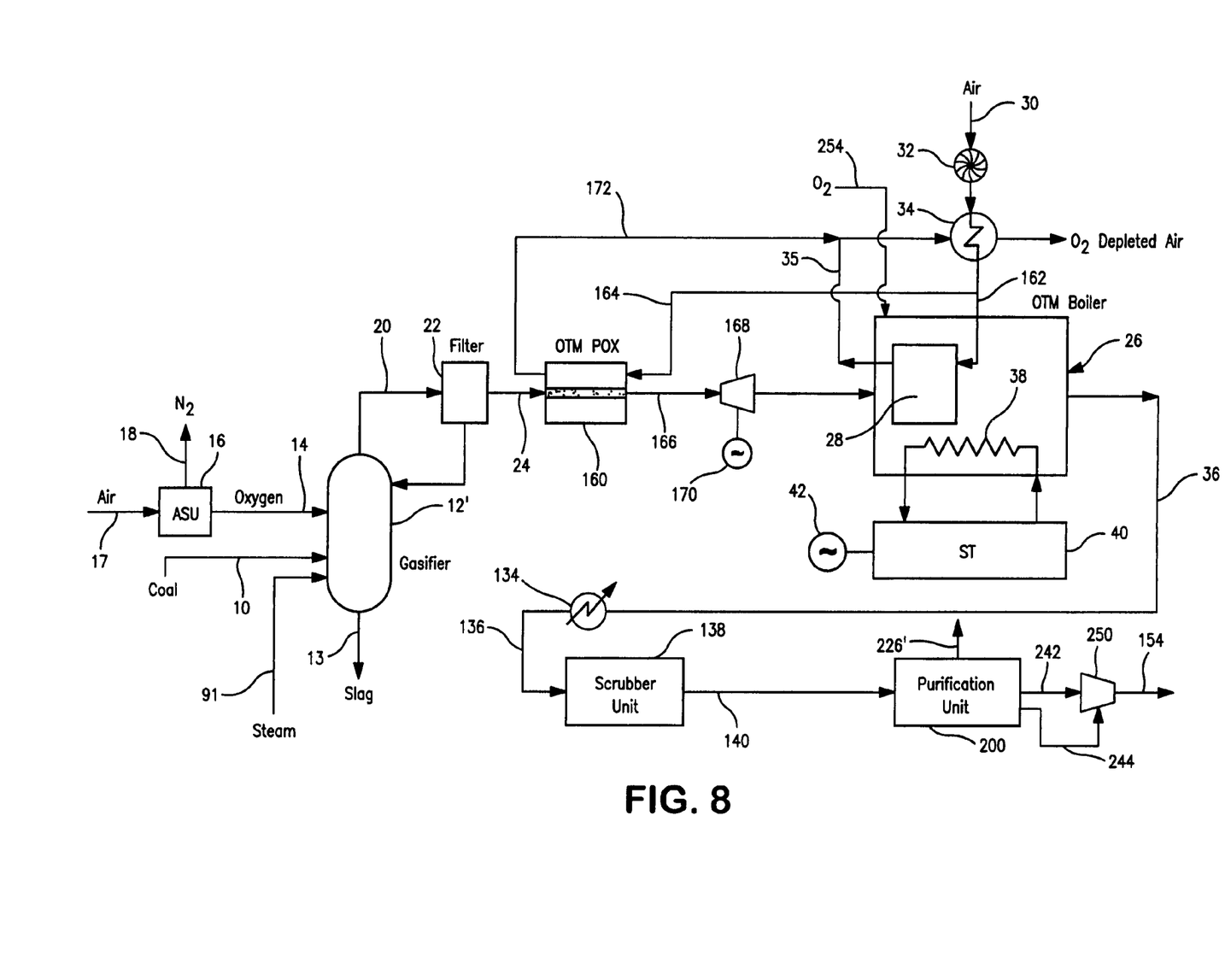
FIG. 8 is an alternative embodiment of FIG. 7.

With reference to FIG. 8, another variation of FIG. 6 is to inject supplemental oxygen containing stream 254 within the radiant section 44 of the oxygen transport membrane boiler 26 to complete the combustion of the fuel. Supplemental oxygen stream 254 is an oxygen containing stream that contains at least about 40% oxygen to prevent the build-up of nitrogen in the carbon dioxide to be captured. A disadvantage of such a process is that inerts are introduced into the flue gas stream 36 and the purity of the carbon dioxide will thereby suffer. In such embodiment, stream 226' can be produced containing the more volatile components of the partly purified flue gas stream that will simply be treated or vented depending on the characteristics of the constituents. The stream 226' could also contain oxygen. Therefore, although not illustrated, catalytic oxidation could be incorporated at the end of the radiant section or the convective section of the oxygen transport membrane boiler 26. This would also reduce the amount of oxygen required to achieve complete combustion. In this regard, to the extent that there exists any excess oxygen in any embodiment of the present invention, such catalytic oxidation could be incorporated together with purification.

The apparatus shown in FIGS. 3, 4 and 5 were modeled using computer programs to assess the predicted performance of such illustrated embodiment. Guidelines set forth in the Carbon Capture and Sequestration Systems Analysis Guidelines, U.S. Department of Energy, Office of Fossil Energy, National Energy Technology Laboratory, April 2005 were used along with the assumptions contained in the EPRI reports, Holt, N., Updated Cost and Performance Estimates for Fossil Fuel Power Plants with $CO_2$ Removal, EPRI Report to DOE-NETL No. 1004483, December (2002), U.S.DOE/ NETL, Pittsburgh and Holt, N., Evaluation of Innovative Fossil Fuel Power Plants with $CO_2$ Removal, EPRI Report to DOE-NETL No. 1000316, December (2000), U.S. DOE/ NETL, Pittsburgh, Pa. The specific assumption listed in Table 1 are used in the examples and may differ from such guidelines.

Tables 4, 5 and 6 present the key streams for processes shown in FIGS. 3, 5 and 4, respectively. The performance comparison for the three cases is summarized in Table 7.

TABLE 1

Process Assumptions

1. IL # 6 Coal
2. ASU oxygen purity: 95%
3. Pressure with BGL Gasifier: 400 psig
4. Pressure with E-gas Gasifier: 800 psig
5. Sulfur removal using wet-FGD
6. Supercritical steam cycle with double reheat: 4050 psia, 1080° F./1111° F./1111° F.
7. $CO_2$ compressed to 2204 psia
8. Air-leak to the boiler: 1% of the flue gas As to the design of the oxygen transport membrane system 28 within oxygen transport membrane boiler 26, for a given size boiler, the surface area and the number of the oxygen transport membrane tubes, such as oxygen transport membrane tubes 50 of FIG. 2, that will be required depends on the oxygen flux per unit area of a tube and the length and diameter of a single tube. By way of example, in order to design an oxygen transport membrane boiler 26 that produces net electric power of about 500 MWe, the amount of coal can be computed. For 500 MWe, 4838 tpd of Illinois number 6 coal will be required. Then, using any of a number of known programs that will simulate the operation of a gasifier, the amount of synthesis gas that will be produced can also be calculated along with the amount of oxygen that will be required. Once the amount of synthesis gas produced from the gasifier is known, a calculation can be formed as to the amount of oxygen required for complete combustion. Assuming only 70% of the oxygen in the feed air will be transferred through the oxygen transport membrane tube, and further assuming that there will be about 0.2 and about 0.4 mol percent of oxygen left in the flue gas. From this the actual amount of oxygen and the amount of feed air that will be required can also be computed. Once the amount of oxygen needed to be transferred through the oxygen transport membrane tube is known the required surface area of the oxygen transport membrane tubes can be calculated provided that the amount of oxygen flux through the oxygen transport membrane tube is known. An assumed oxygen flux for exemplary purposes is about 20 scf/ft$^2$/hr. The exact oxygen flux would of course depend upon membrane material performance. Hence, for low oxygen flux systems, a greater membrane area will be required to achieve the exemplary results set forth below. This would increase capital costs but not decrease efficiency. Using this flux, the surface area requirements can be calculated and samples of such calculation are shown in Table 2 below.

TABLE 2

| Example No. | $O_2$ Requirement (tpd) | $O_2$ Requirement (MM scf/hr) | $O_2$ Flux From OTM Tubes Scf/ft$^2$/hr | OTM Tube Surface (ft$^2$) |
|---|---|---|---|---|
| 1 | 7051 | 6.97 | 20 | 348395.8 |
| 2 | 7051 | 6.97 | 20 | 348395.8 |
| 3 | 6335 | 6.26 | 20 | 312979.2 |

The actual number of oxygen transport membrane tubes will depend on the outer diameter and the length of the tubes. Based on two different tube lengths, the required numbers of tubes for the three examples are given in Table 3.

TABLE 3

| Example No. | No of OTM Tubes (OD = 1 inch Length = 5 ft.) | No. of OTM Tubes (OD = 1 inch Length = 20 ft.) |
|---|---|---|
| 1 | 266048 | 66512 |
| 2 | 266048 | 66512 |
| 3 | 239002 | 59751 |

TABLE 4

(See FIG. 3):

| Parameters/ Components | Units | IL No. 6 Coal (St. 10) | $O_2$ to Gasifier (St. 14) | Steam to Gasifier (St. 91) | Feed Air to OTM-Sys (St. 30) | $O_2$ Depleted Air (St. 35) | Fuel Gas to OTM POX (St. 24) | Fuel Gas to Expander (St. 166) | Fuel Gas to OTM Boiler (Exiting 168) | Flue Gas to FGD (St. 136) | Crude $CO_2$ to Drying & Comp. (St. 140) | $CO_2$ to EOR or Seq. Site (St. 154) |
|---|---|---|---|---|---|---|---|---|---|---|---|---|
| Temp. | F. | 77.0 | 254.0 | 600.0 | 77.0 | 215.0 | 1000.0 | 1799.8 | 705.2 | 163.3 | 154.0 | 110.0 |
| Pressure | psia | 414.7 | 500.0 | 514.7 | 14.7 | 14.7 | 410.0 | 410.0 | 16.0 | 14.8 | 14.7 | 2204.6 |
| Molar Flow | MMscfd | | 65.2 | | 1150.0 | 982.8 | 345.7 | 376.5 | 376.5 | 314.6 | 270.2 | 208.2 |
| Mass Flow | klb/hr | 403.2 | 230.6 | 120.9 | 3656.6 | 3069.0 | 763.4 | 820.0 | 820.0 | 1208.6 | 1105.5 | 982.7 |
| Hydrogen | mol % | | | | | | 25.53 | 32.62 | 32.62 | 0.00 | 0.00 | 0.00 |
| CO | " | | | | | | 46.96 | 40.96 | 40.96 | 0.00 | 0.00 | 0.00 |
| CO2 | " | | | | | | 2.93 | 9.30 | 9.30 | 61.37 | 71.47 | 92.75 |
| Nitrogen | " | | 1.40 | | 78.17 | 91.47 | 2.80 | 2.70 | 2.70 | 3.88 | 4.52 | 5.86 |
| Argon | " | | 3.60 | | 0.93 | 1.09 | 0.68 | 0.63 | 0.63 | 0.75 | 0.87 | 1.13 |
| Methane | " | | | | | | 3.88 | 1.02 | 1.02 | 0.00 | 0.00 | 0.00 |
| Ethane | " | | | | | | 0.12 | 0.00 | 0.00 | 0.00 | 0.00 | 0.00 |
| Propane | " | | | | | | 0.09 | 0.00 | 0.00 | 0.00 | 0.00 | 0.00 |
| n-Butane | " | | | | | | 0.07 | 0.00 | 0.00 | 0.00 | 0.00 | 0.00 |
| Phenols | " | | | | | | 0.06 | 0.00 | 0.00 | 0.00 | 0.00 | 0.00 |
| Naphtha | " | | | | | | 0.07 | 0.00 | 0.00 | 0.00 | 0.00 | 0.00 |

TABLE 4-continued (See FIG. 3):

| Parameters/Components | Units | IL No. 6 Coal (St. 10) | O₂ to Gasifier (St. 14) | Steam to Gasifier (St. 91) | Feed Air to OTM-Sys (St. 30) | O₂ Depleted Air (St. 35) | Fuel Gas to OTM POX (St. 24) | Fuel Gas to Expander (St. 166) | Fuel Gas to OTM Boiler (Exiting 168) | Flue Gas to FGD (St. 136) | Crude CO₂ to Drying & Comp. (St. 140) | CO₂ to EOR or Seq. Site (St. 154) |
|---|---|---|---|---|---|---|---|---|---|---|---|---|
| H2O | " | | | 100.00 | | | 15.60 | 11.91 | 11.91 | 32.83 | 22.94 | 0.00 |
| H2S | " | | | | | | 0.77 | 0.76 | 0.76 | 0.00 | 0.00 | 0.00 |
| COS | " | | | | | | 0.06 | 0.00 | 0.00 | 0.00 | 0.00 | 0.00 |
| SO2 | " | | | | | | 0.00 | 0.00 | 0.00 | 0.91 | 0.00 | 0.00 |
| NH3 | " | | | | | | 0.25 | 0.01 | 0.01 | 0.00 | 0.00 | 0.00 |
| HCN | " | | | | | | 0.06 | 0.00 | 0.00 | 0.00 | 0.00 | 0.00 |
| HCl | " | | | | | | 0.09 | 0.08 | 0.08 | 0.09 | 0.00 | 0.00 |
| Oxygen | " | | 95.00 | | 20.90 | 7.44 | 0.00 | 0.00 | 0.00 | 0.17 | 0.19 | 0.25 |

TABLE 5

(See FIG. 5):

| Parameters/Components | Units | IL No. 6 Coal (St. 10) | O₂ to Gasifier (St. 14) | Steam to Gasifier (St. 91) | Feed Air to OTM-Sys (St. 30) | O₂ Depleted Air (St. 35) | Fuel Gas to OTM POX (St. 24) | Fuel Gas to Expander-1 (Exiting 180) |
|---|---|---|---|---|---|---|---|---|
| Temp. | F. | 77.0 | 254.0 | 600.0 | 77.0 | 215.0 | 1000.0 | 1799.8 |
| Pressure | psia | 414.7 | 500.0 | 514.7 | 14.7 | 15.0 | 410.0 | 410.0 |
| Molar Flow | MMscfd | | 65.2 | | 1150.0 | 982.7 | 345.7 | 376.5 |
| Mass Flow | klb/hr | 403.2 | 230.6 | 120.9 | 3656.6 | 3068.8 | 763.4 | 820.0 |
| Hydrogen | mol % | | | | | | 25.53 | 32.62 |
| CO | " | | | | | | 46.96 | 40.96 |
| CO2 | " | | | | | | 2.93 | 9.30 |
| Nitrogen | " | | 1.40 | | 78.17 | 91.47 | 2.80 | 2.70 |
| Argon | " | | 3.60 | | 0.93 | 1.09 | 0.68 | 0.63 |
| Methane | " | | | | | | 3.88 | 1.02 |
| Ethane | " | | | | | | 0.12 | 0.00 |
| Propane | " | | | | | | 0.09 | 0.00 |
| n-Butane | " | | | | | | 0.07 | 0.00 |
| Phenols | " | | | | | | 0.06 | 0.00 |
| Naphtha | " | | | | | | 0.07 | 0.00 |
| H2O | " | | | 100.00 | | | 15.60 | 11.91 |
| H2S | " | | | | | | 0.77 | 0.76 |
| COS | " | | | | | | 0.06 | 0.00 |
| SO2 | " | | | | | | 0.00 | 0.00 |
| NH3 | " | | | | | | 0.25 | 0.01 |
| HCN | " | | | | | | 0.06 | 0.00 |
| HCl | " | | | | | | 0.09 | 0.08 |
| Oxygen | " | | 95.00 | | 20.90 | 7.43 | 0.00 | 0.00 |

| Parameters/Components | Fuel Gas to OTM POX-2 (Exiting 182) | Fuel Gas to Expander-2 (Exiting 186) | Fuel Gas to OTM Boiler (Exiting 188) | Flue Gas to FGD (St. 136) | Crude CO₂ to Drying & Comp. (St. 140) | CO₂ to EOR or Seq. Site (St. 154) |
|---|---|---|---|---|---|---|
| Temp. | 1199.9 | 1802.6 | 1134.6 | 163.3 | 154.0 | 110.0 |
| Pressure | 90.0 | 90.0 | 16.0 | 14.8 | 14.7 | 2204.6 |
| Molar Flow | 376.5 | 384.0 | 384.0 | 314.7 | 270.2 | 208.2 |
| Mass Flow | 820.0 | 856.4 | 856.4 | 1208.8 | 1105.7 | 982.9 |
| Hydrogen | 32.62 | 31.41 | 31.41 | 0.00 | 0.00 | 0.00 |
| CO | 40.96 | 39.24 | 39.24 | 0.00 | 0.00 | 0.00 |
| CO2 | 9.30 | 11.01 | 11.01 | 61.36 | 71.46 | 92.72 |
| Nitrogen | 2.70 | 2.66 | 2.66 | 3.88 | 4.52 | 5.86 |
| Argon | 0.63 | 0.61 | 0.61 | 0.75 | 0.87 | 1.13 |
| Methane | 1.02 | 0.03 | 0.03 | 0.00 | 0.00 | 0.00 |
| Ethane | 0.00 | 0.00 | 0.00 | 0.00 | 0.00 | 0.00 |
| Propane | 0.00 | 0.00 | 0.00 | 0.00 | 0.00 | 0.00 |
| n-Butane | 0.00 | 0.00 | 0.00 | 0.00 | 0.00 | 0.00 |
| Phenols | 0.00 | 0.00 | 0.00 | 0.00 | 0.00 | 0.00 |
| Naphtha | 0.00 | 0.00 | 0.00 | 0.00 | 0.00 | 0.00 |
| H2O | 11.91 | 14.21 | 14.21 | 32.83 | 22.94 | 0.00 |
| H2S | 0.76 | 0.75 | 0.75 | 0.00 | 0.00 | 0.00 |
| COS | 0.00 | 0.00 | 0.00 | 0.00 | 0.00 | 0.00 |
| SO2 | 0.00 | 0.00 | 0.00 | 0.91 | 0.00 | 0.00 |

TABLE 5-continued (See FIG. 5):

| | | | | | | |
|---|---|---|---|---|---|---|
| NH3 | 0.01 | 0.00 | 0.00 | 0.00 | 0.00 | 0.00 |
| HCN | 0.00 | 0.00 | 0.00 | 0.00 | 0.00 | 0.00 |
| HCl | 0.08 | 0.08 | 0.08 | 0.09 | 0.00 | 0.00 |
| Oxygen | 0.00 | 0.00 | 0.00 | 0.18 | 0.22 | 0.28 |

TABLE 6

(See FIG. 4):

| Parameters/ Components | Units | IL No. 6 Coal (St. 10) | $O_2$ to Gasifier (St. 14) | Feed Air to OTM-Sys (St. 30) | $O_2$ Depleted Air (St. 35) | Raw Syngas from 12" (St. 20) | Fuel Gas to OTM POX (St. 24) | Fuel Gas to Expander (St. 166) | Fuel Gas to OTM Boiler (Exiting 168) | Flue Gas to FGD (St. 136) | Crude $CO_2$ to Drying & Comp. (St. 140) | $CO_2$ to EOR or Seq. Site (St. 154) |
|---|---|---|---|---|---|---|---|---|---|---|---|---|
| Temp. | F. | 77.0 | 274.2 | 77.0 | 215.0 | 1850.0 | 996.6 | 1801.5 | 590.9 | 163.3 | 154.0 | 110.0 |
| Pressure | psia | 814.7 | 978.0 | 14.7 | 15.0 | 810.0 | 800.0 | 800.0 | 16.0 | 14.8 | 14.7 | 2204.6 |
| Molar Flow | MMscfd | | 82.7 | 1025.0 | 874.8 | 367.8 | 367.8 | 364.9 | 364.9 | 303.6 | 260.6 | 200.8 |
| Mass Flow | klb/hr | 403.2 | 292.7 | 3259.1 | 2731.2 | 802.4 | 802.4 | 839.3 | 839.3 | 1177.5 | 1077.4 | 958.9 |
| Hydrogen | mol % | | | | | 32.74 | 32.74 | 28.78 | 28.78 | 0.00 | 0.00 | 0.00 |
| CO | " | | | | | 40.65 | 40.65 | 37.80 | 37.80 | 0.00 | 0.00 | 0.00 |
| CO2 | " | | | | | 10.20 | 10.20 | 13.01 | 13.01 | 63.26 | 73.70 | 95.65 |
| Nitrogen | " | | 1.40 | 78.17 | 91.60 | 0.76 | 0.76 | 0.91 | 0.91 | 1.75 | 2.04 | 2.65 |
| Argon | " | | 3.60 | 0.93 | 1.09 | 0.81 | 0.81 | 0.81 | 0.81 | 0.98 | 1.14 | 1.48 |
| Methane | " | | | | | 1.29 | 1.29 | 1.82 | 1.82 | 0.00 | 0.00 | 0.00 |
| Ethane | " | | | | | 0.00 | 0.00 | 0.00 | 0.00 | 0.00 | 0.00 | 0.00 |
| Propane | " | | | | | 0.00 | 0.00 | 0.00 | 0.00 | 0.00 | 0.00 | 0.00 |
| n-Butane | " | | | | | 0.00 | 0.00 | 0.00 | 0.00 | 0.00 | 0.00 | 0.00 |
| Phenols | " | | | | | 0.00 | 0.00 | 0.00 | 0.00 | 0.00 | 0.00 | 0.00 |
| Naphtha | " | | | | | 0.00 | 0.00 | 0.00 | 0.00 | 0.00 | 0.00 | 0.00 |
| H2O | " | | | | | 12.41 | 12.41 | 16.00 | 16.00 | 32.83 | 22.95 | 0.00 |
| H2S | " | | | | | 0.74 | 0.74 | 0.78 | 0.78 | 0.00 | 0.00 | 0.00 |
| COS | " | | | | | 0.03 | 0.03 | 0.00 | 0.00 | 0.00 | 0.00 | 0.00 |
| SO2 | " | | | | | 0.00 | 0.00 | 0.00 | 0.00 | 0.94 | 0.00 | 0.00 |
| NH3 | " | | | | | 0.23 | 0.23 | 0.01 | 0.01 | 0.00 | 0.00 | 0.00 |
| HCN | " | | | | | 0.06 | 0.06 | 0.00 | 0.00 | 0.00 | 0.00 | 0.00 |
| HCl | " | | | | | 0.08 | 0.08 | 0.08 | 0.08 | 0.10 | 0.00 | 0.00 |
| Oxygen | " | | 95.00 | 20.90 | 7.31 | 0.00 | 0.00 | 0.00 | 0.00 | 0.14 | 0.17 | 0.22 |

TABLE 7

| Parameters | Units | Example 1 BGL with 1 OTM-POX FIG. 3 | Example 2 BGL with 2 OTM POX FIG. 5 | Example 3 E-Gas with 1 OTM-POX FIG. 4 |
|---|---|---|---|---|
| Coal Feed | tpd | 4,838 | 4,838 | 4,838 |
| Heat Input as Coal (HHV) | MMbtu/hr | 4,703 | 4,703 | 4,703 |
| Heat Input as Coal (LHV) | MMbtu/hr | 4,486 | 4,486 | 4,486 |
| Gross Power Summary | | | | |
| Steam Turbine | MW | 514.3 | 500.0 | 506.0 |
| Fuel Gas Expander-1 | MW | 111.4 | 62.8 | 123.5 |
| Fuel Gas Expander-2 | MW | 0.0 | 71.2 | |
| Generator Loss | MW | 6.3 | 6.3 | 6.3 |
| Gross Plant Power | MW | 619.4 | 627.7 | 623.2 |
| Power Consumptions | | | | |
| ASU | MW | 35.0 | 35.0 | 58.0 |
| CO2 Capture & Compression | MW | 51.4 | 51.4 | 49.2 |
| Air Blowers | MW | 22.5 | 22.5 | 20.0 |
| Other Plant Aux. | MW | 21.0 | 21.0 | 29.9 |
| Total Auxillary Power | MW | 129.9 | 129.9 | 157.1 |
| Net Power | MW | 489.5 | 497.8 | 466.1 |
| HHV Efficiency | % | 35.5 | 36.1 | 33.8 |
| LHV Efficiency | % | 37.2 | 37.9 | 35.5 |

As is apparent from Table 7, the embodiment of FIG. 5 provided the most net power and was also the most efficient.

While the present invention has been described to a preferred embodiment, as will be understood by those skilled in the art, numerous changes and omissions can be made without departing from the spirit and the scope of the present invention which is set forth in the presently pending claims.

We claim:

1. A method of generating electrical power comprising:
   generating a synthesis gas stream in a gasifier;
   partially oxidizing the synthesis gas stream in at least one partial oxidation stage to oxidize a volatile content of the synthesis gas stream and to heat the synthesis gas stream, the at least one partial oxidation stage formed by an oxygen transport membrane reactor generating oxygen to support the partial oxidation of the synthesis gas stream;
   expanding the synthesis gas stream in an expander of at least one expansion stage after having been heated in the at least one partial oxidation stage and generating electrical power from a generator coupled to the expander;
   combusting the synthesis gas stream, after having been expanded, within an oxygen transport membrane boiler to generate heat and a flue gas, the synthesis gas stream being combusted while at an elevated temperature;
   the flue gas containing carbon dioxide;
   the combusting of the synthesis gas stream supported by separating additional oxygen from an oxygen containing stream within an oxygen transport membrane system operatively associated with a boiler within the oxygen transport membrane boiler;
   producing steam within the boiler by indirectly transferring the heat to boiler feed water;
   extracting energy from the steam by a steam turbine system of a steam cycle operatively associated with the oxygen transport membrane boiler and converting the energy to additional electrical power by an additional electrical generator coupled to the steam turbine system; and
   purifying the flue gas stream to produce a carbon dioxide-rich stream.

2. The method of claim 1, wherein the at least one expansion stage and the at least one partial oxidation stage is a first partial oxidation stage followed by a first expansion stage, a second partial oxidation stage following the first expansion stage and a second expansion stage following the second partial oxidation stage.

3. The method of claim 1, wherein:
   the combusting of the synthesis gas stream is incomplete resulting in fuel species being present within the flue gas stream; and
   the fuel species are separated from the flue gas stream and recycled to the at least one partial oxidation stage.

4. The method of claim 1 or claim 2 or claim 3, wherein the carbon dioxide is purified by:
   cooling the flue gas stream to produce a cooled flue gas stream;
   removing sulfur dioxide from the cooled flue gas stream;
   after removing the sulfur dioxide from the flue gas stream, compressing the flue gas stream and then drying the flue gas stream in a dryer to produce a carbon dioxide containing stream having a purity of no less than about 90% by volume; and
   further compressing the carbon dioxide containing stream to produce a carbon dioxide product stream.

5. The method of claim 3, wherein:
   the combusting of the synthesis gas stream is incomplete resulting in fuel species being present within the flue gas stream;
   the carbon dioxide is purified by: cooling the flue gas stream to produce a cooled flue gas stream;
   removing sulfur dioxide from the cooled flue gas stream;
   after removing the sulfur dioxide from the flue gas stream, compressing the flue gas stream and then drying the flue gas stream in a dryer to produce a carbon dioxide containing stream having a purity of no less than about 90% by volume;
   further compressing the carbon dioxide containing stream to produce a carbon dioxide product stream; and
   the fuel species are separated from the flue gas stream after having been dried and prior to having been further compressed and recycled to the at least one partial oxidation stage.

6. The method of claim 4, wherein the gasifier generates the synthesis gas stream through gasification of coal supported by further oxygen.

7. The method of claim 6, wherein the gasification of the coal is conducted in a moving bed gasifier utilizing steam generated by the steam cycle.

8. The method of claim 4, wherein the steam cycle is an ultra-supercritical steam cycle.

9. The method of claim 1, wherein the gasifier generates the synthesis gas stream through gasification of coal supported by oxygen.

10. The method of claim 9, wherein the gasification of the coal is conducted in a moving bed gasifier utilizing steam generated by the steam cycle.

11. The method of claim 10, wherein the steam cycle is an ultra-supercritical steam cycle.

12. The method of claim 1, wherein:
   the gasifier is an entrained flow gasifier;
   the synthesis gas stream is cooled by indirect heat exchange with a heated boiler feed water stream to produce a steam stream; and
   the steam stream is combined with steam produced within the boiler.

13. The method of claim 1, wherein:
   the combustion of the synthesis gas stream supported by separating the additional oxygen from an oxygen containing stream within an oxygen transport membrane system is not complete; and
   the combustion of the synthesis gas stream is completed by addition of an additional oxygen containing stream.

* * * * *